US012394235B2

(12) United States Patent
Nasir et al.

(10) Patent No.: US 12,394,235 B2
(45) Date of Patent: Aug. 19, 2025

(54) LANGUAGE-AGNOSTIC OCR EXTRACTION

(71) Applicant: Microsoft Technology Licensing, LLC, Redmond, WA (US)

(72) Inventors: Osaid Rehman Nasir, New Delhi (IN); Bharat Kumar Jain, Hyderabad (IN); Smitkumar Narotambhai Marvaniya, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

(21) Appl. No.: 18/071,371

(22) Filed: Nov. 29, 2022

(65) Prior Publication Data

US 2024/0177513 A1    May 30, 2024

(51) Int. Cl.
*G06V 30/24* (2022.01)
*G06F 40/40* (2020.01)
(Continued)

(52) U.S. Cl.
CPC .......... *G06V 30/2528* (2022.01); *G06F 40/40* (2020.01); *G06V 30/1448* (2022.01); *G06V 30/19147* (2022.01); *G06V 30/274* (2022.01)

(58) Field of Classification Search
CPC ........... G06V 30/2528; G06V 30/1448; G06V 30/19147; G06V 30/274; G06V 30/10; G06V 10/82; G06V 30/153; G06V 30/19173; G06V 30/1916; G06V 30/413; G06V 30/18057; G06V 20/63; G06V 20/582; G06V 30/19133; G06V 30/1463; G06V 20/20; G06V 30/127; G06V 30/414; G06V 30/416; G06V 10/764;
(Continued)

(56) References Cited

U.S. PATENT DOCUMENTS 10,936,897 B2 *  3/2021  Vig ........................ G06F 18/217
11,699,275 B2 *  7/2023  Kurma .................... G06F 40/20
                                                              382/156
(Continued)

OTHER PUBLICATIONS

Tiwary, Saurabh, "Turing Bletchley: A Universal Image Language Representation model by Microsoft", Retrieved from: https://www.microsoft.com/en-us/research/blog/turing-bletchley-a-universal-image-language-representation-model-by-microsoft/, Nov. 1, 2021, 10 Pages.

(Continued)

*Primary Examiner* — Iriana Cruz
(74) *Attorney, Agent, or Firm* — Nicholson De Vos Webster & Elliott LLP

(57) ABSTRACT

Technologies for language agnostic OCR extraction include identifying a word region of an image using optical character recognition, applying a language agnostic machine learning model to the word region, where the language agnostic machine learning model is trained on training data including a set of image-text pairs and a set of multilingual text translation pairs, receiving, from the language agnostic machine learning model, a word region embedding that is associated with the word region, searching a multilingual index for a text embedding that matches the word region embedding, receiving, from the multilingual index, text associated with the text embedding; and outputting at least one of the text or the text embedding to at least one downstream process, application, system, component, or network.

20 Claims, 9 Drawing Sheets

(51) Int. Cl.
*G06V 30/14* (2022.01)
*G06V 30/19* (2022.01)
*G06V 30/262* (2022.01)

(58) Field of Classification Search
CPC ............... G06V 30/412; G06V 10/987; G06V 30/1444; G06V 30/16; G06V 30/18; G06V 30/19007; G06V 30/199; G06V 30/20; G06V 10/267; G06V 10/774; G06V 10/778; G06V 10/806; G06V 10/84; G06V 10/87; G06V 20/10; G06V 20/70; G06V 30/293; G06V 10/449; G06V 10/762; G06V 10/7753; G06V 10/817; G06V 20/62; G06V 30/133; G06V 30/148; G06V 30/18086; G06V 30/18152; G06V 30/1831; G06V 30/1908; G06V 30/19093; G06V 30/1918; G06V 30/194; G06V 30/262; G06V 30/43; G06V 30/19167; G06V 30/287; G06F 40/40; G06F 40/58; G06F 40/30; G06F 40/20; G06F 18/214; G06F 18/24; G06F 18/2413; G06F 40/10; G06F 40/51; G06F 40/284; G06F 18/24143; G06F 18/29; G06F 40/00; G06F 40/216; G06F 40/295; G06F 18/21; G06F 18/241; G06F 18/2113; G06F 18/23; G06F 40/109; G06F 40/126; G06F 40/279; G06F 40/289; G06N 3/08; G06N 3/084; G06N 3/044; G06N 20/20; G06N 3/045; G06N 5/01; G06N 5/02; G06N 5/046; G06N 20/00; G06N 3/0442; G06N 3/047; G06N 3/088; G06N 20/10; G06N 3/04; G06N 3/042; G06N 3/0455; G06N 3/0464; G06N 3/048; G06N 3/082; G05D 1/0088; G06T 11/20; G06T 2210/12; G06T 7/11; G06T 9/00; G06T 2207/20084; G06T 2207/20092; G06T 2207/20101; G06T 2207/20081; G06T 2207/30168; G06T 2207/30176; G06T 7/0002; G06Q 10/10; G10L 15/26
USPC ......................................................... 382/159
See application file for complete search history.

(56) References Cited

U.S. PATENT DOCUMENTS

| | | | |
|---|---|---|---|
| 2003/0200078 A1 | 10/2003 | Luo et al. | |
| 2004/0260535 A1 | 12/2004 | Chen et al. | |
| 2013/0039570 A1* | 2/2013 | Vincent | G06T 11/60 382/159 |
| 2016/0162467 A1* | 6/2016 | Munro | G06F 40/30 704/9 |
| 2016/0203124 A1* | 7/2016 | Cuthbert | G06F 40/51 704/2 |
| 2016/0350288 A1* | 12/2016 | Wick | G06F 40/44 |
| 2019/0197119 A1* | 6/2019 | Zhang | G06F 16/35 |
| 2020/0387677 A1* | 12/2020 | Kim | G06F 40/35 |
| 2022/0138439 A1 | 5/2022 | Tambi et al. | |
| 2022/0350998 A1* | 11/2022 | Desai | G06N 3/0442 |
| 2023/0016729 A1* | 1/2023 | Pouran Ben Veyseh | G06F 40/30 |
| 2023/0073775 A1* | 3/2023 | Goldstein | G06F 16/58 |
| 2024/0054294 A1* | 2/2024 | Sikka | G06F 40/30 |
| 2025/0036877 A1* | 1/2025 | Rhatigan | G06N 3/0475 |

OTHER PUBLICATIONS

Wang, et al., "Improving OCR-Based Image Captioning by Incorporating Geometrical Relationship", In Proceedings of the IEEE/CVF Conference on Computer Vision and Pattern Recognition, Jun. 19, 2021, pp. 1306-1315.

* cited by examiner

LANGUAGE-AGNOSTIC OCR EXTRACTION

TECHNICAL FIELD

A technical field to which the present disclosure relates is optical character recognition (OCR). Another technical field to which the present disclosure relates is OCR extraction.

BACKGROUND

Software applications use computer networks to distribute digital content, including images, video, and multi-media content, among computing devices on a very large scale. Software applications can regularly receive millions of content uploads and distribute uploaded content items to tens or even hundreds of millions of user devices.

Optical character recognition (OCR) includes the automated conversion of typed, handwritten or printed text contained in a digital image to a text document.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
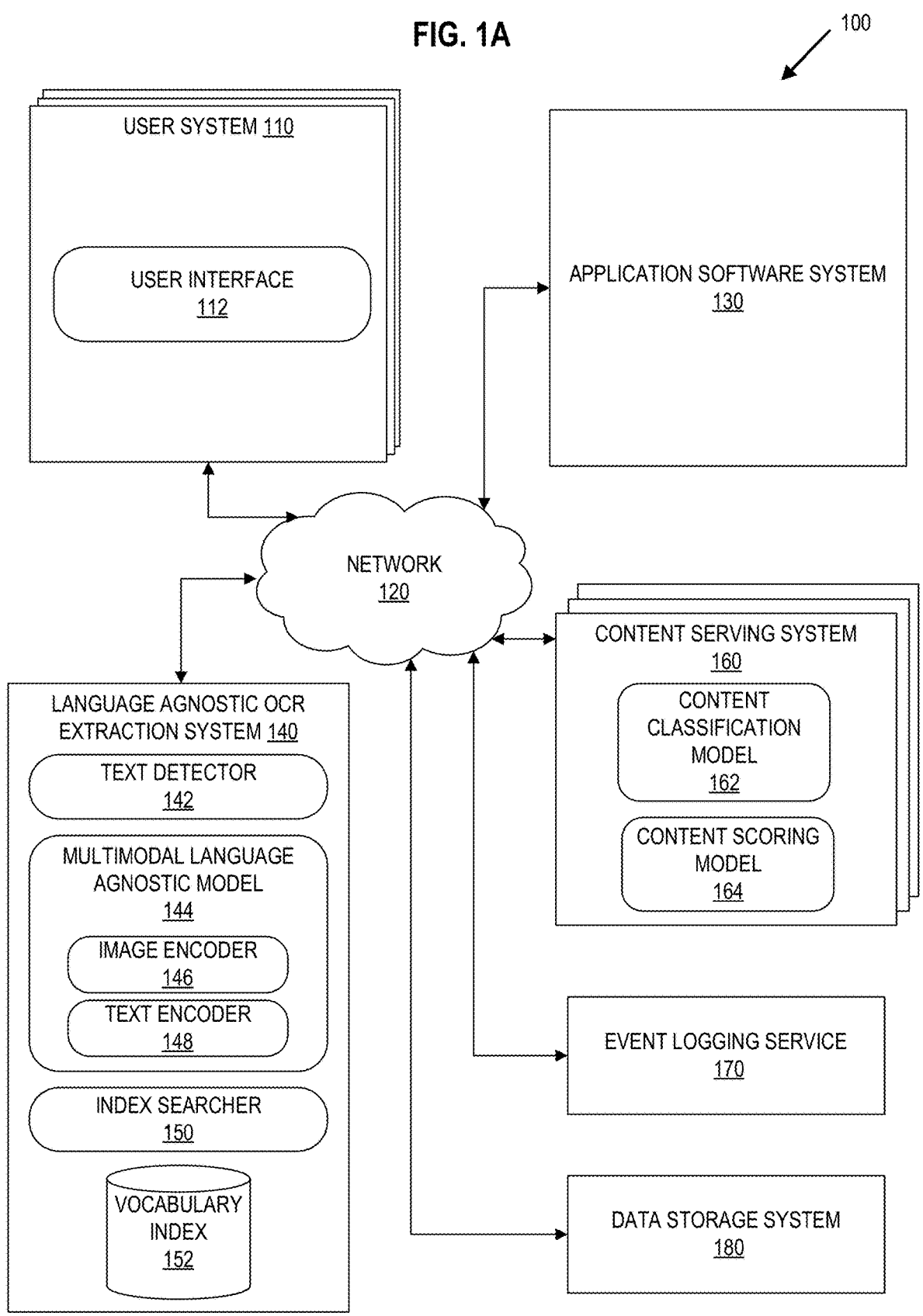
FIG. 1A illustrates an example computing system 100 that includes a language agnostic optical character recognition (OCR) extraction system 140 in accordance with some embodiments of the present disclosure.

Optical character recognition can be used to convert a picture or scanned image of text to a text format. The text format output by the OCR system can be used to generate a label or caption for the image, or to classify, rank, or score the image for downstream processing, for instance. Examples of digital images include scanned documents, digital photos of documents, digital photos of scenes that contain text, pictures, graphics, memes, videos, video frames, and subtitle text superimposed on an image or a video. Image as used herein may refer to an electronically scanned document or a digital photograph. The term digital imagery as used herein may refer to one or more digital images.

OCR processing systems include a scanning component and an extraction component. The scanning component reads and extracts pixel values from the input image. The extraction component converts the scanner output to corresponding text characters and stores the text characters in a text file format. A text file format includes any type of file format that stores plain text. A text file can be edited in any text-editing or word-processing program. Examples of text file formats include files that have the .txt or .doc extension.

Prior OCR extraction technologies employ a character-by-character approach to text extraction. In the character-by-character approach, the OCR extraction routine converts pixel patterns to individual text characters. The character-by-character approach frequently produces errors in the text output. If the quality of an image is poor or portions of a word are occluded, for instance, the character-by-character approach is likely to misread or fail to read at least one of the characters in the image. For example, the character-by-character approach might convert an image of the word DRIVE to the text DRNE, incorrectly reading the IV as an N. These errors at the OCR extraction stage are often propagated to downstream processing. For instance, if the OCR extraction produces an image caption "DRNE" instead of "DRIVE," the image may be incorrectly scored, grouped, ranked, or classified by a downstream process based on the incorrect OCR output.

Some prior methods have added error correction technologies to the OCR extraction processing, on top of the character-by-character extraction, to improve accuracy. However, the multiple layers of extraction and error correction post-processing required by the prior approaches are computationally intensive and demanding of computing resources. As a result, the prior approaches have become unworkable in online environments in which vast quantities of digital imagery are constantly being uploaded and distributed by software applications and across computer networks.

Additionally, the user base of software applications and networks is often multicultural and multilingual. This leads to a proliferation of digital imagery containing text in many different languages. Some prior OCR approaches are difficult to adapt to a multilingual environment because they require a separate text language recognizer to recognize the language of particular scanned text, and also require a separate language model or additional model fine-tuning steps for each language that may be encountered in an image. For example, if a prior OCR system is configured to read English and Spanish text, that prior system will be unable to read French text unless a French language model is added to the system or an existing model is fine-tuned to recognize French words. The need for prior approaches to construct, train, and maintain many different language models is therefore a barrier to use of OCR extraction in multilingual online environments.

This disclosure provides technical solutions to the above-described challenges and other shortcomings of prior OCR extraction methods. In contrast to prior approaches, the disclosed technologies do not use character-by-character extraction. Additionally, the disclosed technologies do not require a text language recognizer or any language-specific models.

The disclosed technologies enable a wide range of vision tasks to be conducted more efficiently. For example, the disclosed technologies enable language agnostic OCR text generation and image caption generation without requiring language-labeled training data or model fine-tuning steps.

The disclosed technologies utilize a multimodal language agnostic machine learning model, which may be referred to as a language vision model. Multimodal as used herein means that the model can encode different content modalities (e.g., text, image, video) in the same latent space. Latent space as used herein may refer to a multi-dimensional mathematical space that encodes semantic representations of data samples. Samples that are semantically similar are positioned close to each other in the latent space (e.g., have similar x, y, z coordinates). Other terms for latent space include embedding space, feature space, or vector space. Language agnostic as used herein means that the OCR extraction system does not need to determine the language of an input text as a prerequisite to performing extraction.

The multimodal language agnostic machine learning model captures semantic and syntactic information contained within the input image. The semantic and syntactic information output by the multimodal language agnostic model is used as an input to the OCR extraction process. Since the multimodal language agnostic machine learning model does not require a text language recognizer or any language-specific models, the amount of training data, training time, and inference time are all reduced in comparison to the above-described prior approaches.

Implementations of the disclosed technologies configure a Turing Bletchley model for language agnostic OCR extraction. The Turing Bletchley model configured for OCR extraction encodes semantically similar text and images together in the same latent space irrespective of the language of the text. Consequently, the computation needed by prior systems for language detection is not needed by the disclosed approaches.

Whereas prior approaches are unable to scale OCR for different languages quickly because they require language-labeled training data, which is typically done by human annotation, the disclosed technologies can support previously unseen languages without requiring any language-labeled training data. Instead, implementations of the disclosed multimodal language agnostic model are trained based on a large corpus of unlabeled text translation pairs, where an unlabeled text translation pair is, for example, [$w_{l1}$, $w_{l2}$], in which w is a word, l1 is a first language, and l2 is a second language. These text translation pairs are collected by, for example, web crawlers and publicly available sources on the Internet.

Implementations of the disclosed technologies use an indexed vocabulary to accelerate the text extraction. For example, implementations perform a dictionary search using a nearest neighbor algorithm to provide lookups, which is faster than the text recognizers of the prior approaches that need to decode the image character by character and then run a model inference on each character. In experiments, dictionary lookups using the disclosed approaches were computed in under 10 milliseconds. In comparison, the prior approaches took 200 milliseconds (a much longer computational time) to perform decoding and inferencing on a similar input.

In the above-described prior approaches, since each language has a language specific recognizer, the model size increases linearly with the number of languages. Thus, to use the prior approaches in a multilingual online environment, hardware resource requirements and operational overhead constantly increase as new languages are added. However, in the disclosed technologies, the size of the multimodal language agnostic machine learning model is constant because it is language agnostic. As a result, the multimodal language agnostic machine learning model is much easier to maintain on resource-constrained systems than the models used by prior approaches.

The prior approaches that use a text recognizer that works by recognizing each individual character one at a time have a higher word error rate since a word will be misrecognized or not recognized at all if even one character is recognized incorrectly. In the disclosed technologies, text recognition is done at the word level, not at the character level. Since the disclosed approaches directly recognize words, the probability of a whole word being recognized incorrectly is lower in comparison to the prior approaches. The resulting reduction in word recognition errors improves downstream applications, processes, and models that rely on the accuracy of the OCR output.

In the prior approaches, when a language cannot be identified discriminatively, the language is inferred using proxy signals such as the language of adjacent commentary text. These inferences may or may not be correct, especially in multilingual online systems. Since the disclosed technologies do not need to identify the language of an input at all, language inferencing technology is not required and the associated risks of inference errors are avoided.

The disclosed technologies are not limited to multilingual applications. Because the disclosed technologies are language agnostic, they can be used, and work the same way, in single language environments or applications.

Aspects of the disclosed technologies are described in the context of online systems including online network-based digital content distribution. An example of a content distribution use case is the distribution of user-generated content such as messages, memes, articles, and posts, through an online social network. Another example of a content distribution use case is the distribution of digital advertisements and recommendations for products and/or services through an online social network. However, aspects of the disclosed technologies are not limited to ads or recommendations distribution, or to social media applications, but can be used to improve OCR extraction for other applications. Further, any network-based application software system can act as a content distribution system. For example, news, entertainment, and e-commerce apps installed on mobile devices, messaging systems, and social graph-based applications can all function as content distribution systems.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1A illustrates an example computing system 100 that includes a language agnostic optical character recognition (OCR) extraction system 140 in accordance with some embodiments of the present disclosure.

In the embodiment of FIG. 1, computing system 100 includes one or more user systems 110, a network 120, an application software system 130, a language agnostic OCR extraction system 140, a content serving system 160, an event logging service 170, and a data storage system 180.

As described in more detail below, content serving system 160 includes at least one content classification model 162 and at least one content scoring model, and language agnostic OCR extraction system 140 includes a text detector 142, a multimodal language agnostic model 144, an image searcher 150, and a vocabulary index 152.

User system 110 includes at least one computing device, such as a personal computing device, a server, a mobile computing device, or a smart appliance. User system 110 includes at least one software application, including a user interface 112, installed on or accessible by a network to a computing device. For example, embodiments of user interface 112 include a graphical display screen that includes at least one slot. A slot as used herein refers to a space on a graphical display such as a web page or mobile device screen, into which digital content including digital imagery may be loaded for display to the user. The locations and dimensions of a particular slot on a screen are specified using, for example, a markup language such as HTML (Hypertext Markup Language). On a typical display screen, a slot is defined by two-dimensional coordinates. In other implementations such as virtual reality or augmented reality implementations, a slot may be defined using a three-dimensional coordinate system.

User interface 112 can be used to input data, upload, download, receive, send, or share content including digital imagery, initiate user interface events, and view or otherwise perceive output such as data produced by application software system 130. For example, user interface 112 can include a graphical user interface and/or a conversational voice/speech interface that includes a mechanism for logging in to application software system 130, clicking or tapping on GUI elements, and interacting with digital content items. Examples of user interface 112 include web browsers, command line interfaces, and mobile app front ends. User interface 112 as used herein can include application programming interfaces (APIs).

Application software system 130 is any type of application software system that provides or enables the input and output of at least one form of digital content including digital imagery to user systems such as user system 110 through user interface 112. Examples of application software system 130 include but are not limited to connections network software, such as social media platforms, and systems that are or are not be based on connections network software, such as general-purpose search engines, specific-purpose search engines, job search software, recruiter search software, sales assistance software, content distribution software, learning and education software, e-commerce software, enterprise software, or any combination of any of the foregoing or other types of software.

Language agnostic OCR extraction system 140 includes a text detector 142, a multimodal language agnostic model 144, an index searcher 150, and a vocabulary index 152. Text detector 142 contains computer code capable of causing at least one processor to scan digital imagery and identify, in the scanned imagery, the presence of one or more words. For example, text detector 142 identifies Cartesian coordinates of the endpoints of a diagonal of a bounding box that encompasses the portion of an input image that contains one or more words. An example of output produced by a processor executing text detector 142 is [(x1, y1); (x2, y2)], where (x1, y1) identifies the x and y coordinates of a top left corner of a rectangle and (x2, y2) identifies the x and y coordinates of a bottom right corner of the same rectangle.

Multimodal language agnostic model 144 is a machine learning model trained to encode semantically similar images and text in the same latent space, which has been configured for OCR extraction. For example, training data used to create multimodal language agnostic model 144 includes both text translation pairs and image-caption pairs. An example of an image-caption pair of training data is [i1, c1], where i1 identifies an input image and c1 identifies a caption that describes the subject matter depicted in i1 as a ground-truth. Neither the text translation pairs nor the image-caption pairs used to train multimodal language agnostic model 144 contain a language identifier. For example, a text translation pair used to train multimodal language agnostic model 144 is [t1, t2] and not [(t1, l1); (t2, l2)], where t is a text sample and/identifies a language (e.g., French, English, Hindi). Similarly, an image-caption pair used to train multimodal language agnostic model 144 is [i1, c1] and not [(i1, c1, l1); (i2, c2, l2)], where i identifies an input image, c identifies a caption that is associated with the image, and/identifies a language. In some implementations, model 144 is trained using a metric-learning loss function, such as the contrastive loss function. The contrastive loss function plots clusters of data points that belong to the same class closer together in the latent space while at the same time plotting clusters of samples from different classes further apart (farther away from each other).

Multimodal language agnostic model 144 is constructed as a deep neural network, using a transformer architecture, for example. In some implementations, multimodal language agnostic model 144 includes a version of the Turing Bletchley Universal Image Language Representation model (T-UILR), available from Microsoft Corporation, which is configured for OCR extraction as described herein. For example, the T-UILR includes 2.5 billion parameters and can perform image and text encoding in 94 different languages. In other implementations, other vision language models are used alternatively or in addition to T-UILR.

Multimodal language agnostic model 144 includes an image encoder 146 and a text encoder 148. Image encoder 146 is an encoder portion of multimodal language agnostic model 144 that converts image inputs to image embeddings. For example, image encoder 146 creates a multidimensional (e.g., 1024 dimension) vector representation, or image embedding, of an image input, which plots the image input as a point in a latent semantic space that is defined based on the training data used to train the model 144.

Figure 1B:
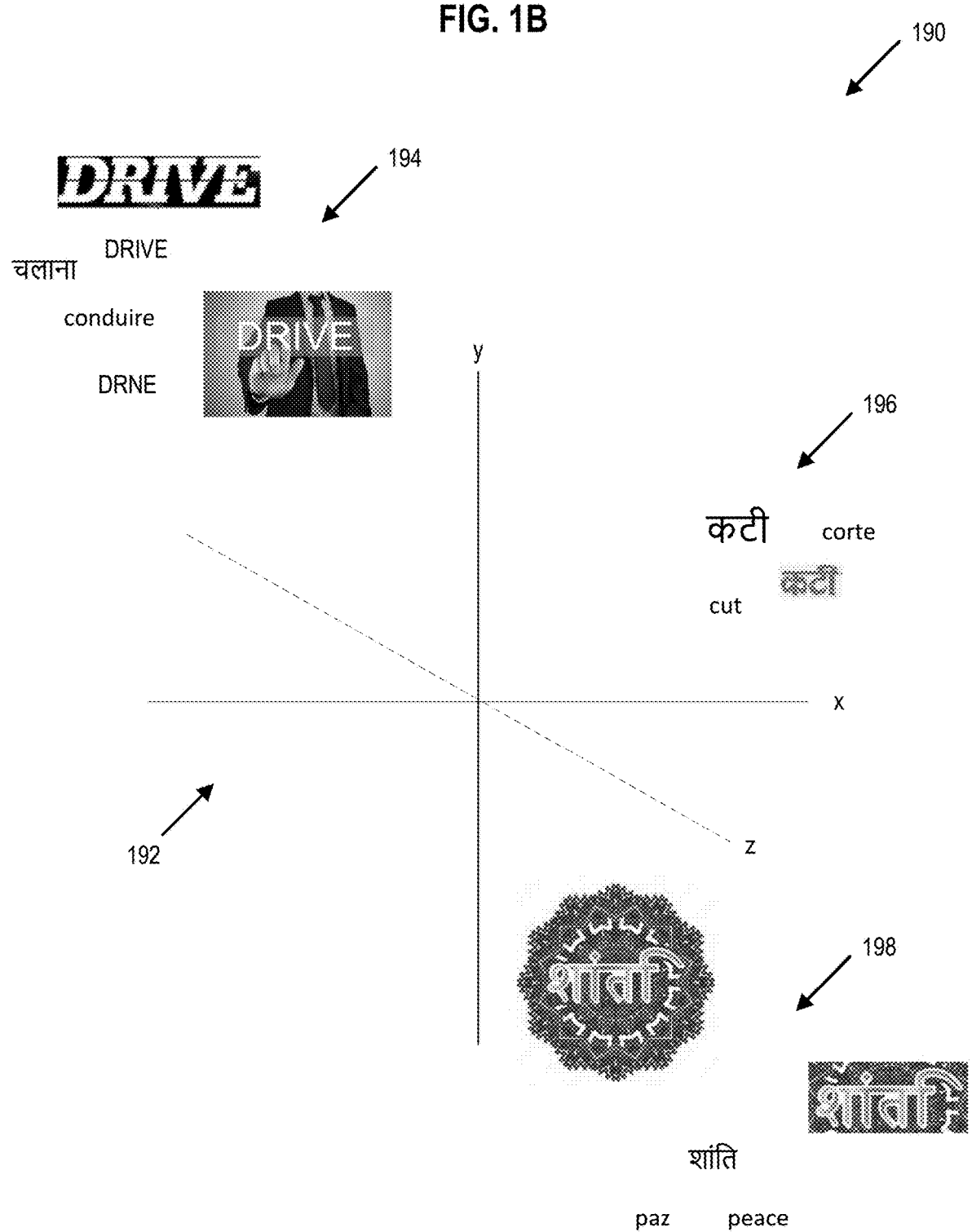
FIG. 1B illustrates an example multimodal language agnostic model 190 in accordance with some embodiments of the present disclosure.

Text encoder 148 is another encoder portion of multimodal language agnostic model 144 that converts text inputs to text embeddings. Text encoder 148 creates a multidimensional (e.g., 1024 dimension) vector representation, or text embedding, of a text input, which plots the text input as a point in the same latent semantic space. The image embeddings produced by image encoder 146 and the text embeddings produced by text encoder 148 are configured so that semantically similar texts and images are associated with (e.g., align semantically with) each other in the same latent semantic space. An example of multimodal language agnostic model 144 is shown in FIG. 1B, described below.

Index searcher 150 contains computer code capable of causing at least one processor to perform a search of vocabulary index 152 based on output of multimodal language agnostic model 144. For example, when multimodal language agnostic model 144 generates an image embedding for an input image, index searcher 150 executes a nearest neighbor search on vocabulary index 152 to find a text embedding that matches (e.g., most closely corresponds semantically to) the image embedding produced by multimodal language agnostic model 144 for the image that was input into multimodal language agnostic model 144.

Examples of nearest neighbor algorithms include the k-nearest neighbor algorithm and the fuzzy k-nearest neighbor algorithm. The k-nearest neighbor algorithm is a non-parametric, supervised learning classifier that uses proximity to make classifications or predictions about the grouping of an individual data point. The value of k indicates the number of nearest neighbors returned by the algorithm. For example, if k=1, the nearest neighbor search will only return one data point that is most similar to the input. In the described implementations of index searcher 150, the value of k is set to one. In other implementations, the value of k is a positive integer greater than one, and the set of k nearest neighbors is post-processed to select the nearest text embedding from the set of k nearest neighbors.

Vocabulary index 152 is an index of a vocabulary that is stored, for example, in data storage system 180. The vocabulary contains words in text format, which have been curated from one or more data sources, such as publicly available web pages and web content. Vocabulary index 152 is created by inputting each word of the vocabulary to multimodal language agnostic model 144 and generating, by multimodal language agnostic model 144, a text embedding for each such word. As a result, vocabulary index 152 contains a mapping of text embeddings to plain text words. Vocabulary index 152 is stored in, for example, a searchable database. Vocabulary index 152 is implemented using, for example, a tree data structure such as a B-tree or an R-tree, an inverted list, or a hash index.

The vocabulary used to create vocabulary index 152 is multilingual and contains words in multiple different languages, and their associated word embeddings, in some implementations. In some implementations, the vocabulary used to create vocabulary index 152 is considered universal or general-purpose, like a dictionary. In other implementations, the vocabulary used to create vocabulary index 152 is curated for a particular domain, such as a particular language or a particular application. For instance, in some applications, the vocabulary and associated vocabulary index 152 includes special terminologies or specific types of proper nouns, such as job titles, skills, and company names.

The vocabulary, whether general-purpose or domain-specific, is created by a manual process, one or more automated processes such as bots and web crawlers, or a combination of manual processes and automated processes. For example, an automated process can extract words from an online system or a publicly available data source such as an Internet-based dictionary, and then run each extracted word through a machine translation program to obtain translations of the word in multiple different languages. A manual process can be used to filter or supplement the vocabulary with domain-specific words such as words commonly used in a particular industry. For example, human experts in a particular domain can add words to the vocabulary that are specific to their domain, such as Java and Python for software engineering, and remove words that are not applicable to that domain, such as ice cream. Alternatively or in addition, automated processes can scan search histories or online databases for common or unusual search terms and add those terms to the vocabulary.

Content serving system 160 is a data storage service, such as a web server, which stores digital content items and delivers digital content items to, for example, web sites and mobile apps or to particular slots of web sites or mobile app user interface display screens. The digital content items stored and distributed by content serving system 160 can contain various types of content including digital imagery.

In some embodiments, content serving system 160 processes requests from, for example, application software system 130, and distributes digital content items to user systems 110 in response to requests. A request is, for example, a network message such as an HTTP (HyperText Transfer Protocol) request for a transfer of data from an application front end to the application's back end, or from the application's back end to the front end. A request is formulated, e.g., by a browser at a user device, in connection with a user interface event such as a login, click or a page load. In some implementations, content serving system 160 is part of application software system 130.

Content serving system 160 includes at least one content classification model 162 and at least one content scoring model 164. Content classification model 162 is a machine learning model that has been trained to classify an input by assigning one or more semantic labels to the input based on a statistical or probabilistic similarly of the input to labeled data used to train the model. Content classification model 162 is created by applying a machine learning algorithm, such as linear regression or logistic regression, to a set of training data using, for example, a supervised machine learning technique. In supervised machine learning, the set of training data includes labeled data samples. In some implementations, content classification model 162 is created by applying a clustering algorithm, such as k means clustering, to a set of training data that includes unlabeled data samples, using an unsupervised machine learning technique. An example of a content classification model is a binary classifier that identifies inputs as either spam or not spam. Another example of a content classification model is a topic model that assigns an input to one topic or multiple topics based on similarities between the input and the unlabeled data used to train the model.

Content scoring model 164 is a machine learning model that is trained to generate a score for a pair of inputs, where the score statistically or probabilistically quantifies a strength of relationship, correlation, or affinity between the inputs in the pair. Content scoring model 164 includes, for example, a deep learning neural network model that is trained on training data that includes ground-truth sets of data pairs. Examples of content scoring models include ranking models that ranks content items for distribution to a particular user, such as for inclusion in a user's news feed, where the ranking is based on training examples of the user's history of clicking or not clicking on content items displayed in user interface 112 (e.g., [user1, contentID1, click]; [user1, contentID2, no click]).

Event logging service 170 captures user interface events generated at the user interface 112, such as page loads and clicks, in real time, and formulates the user interface events into a data stream that can be consumed by, for example, a stream processing system. For example, when a user of user system 110 clicks on a user interface element such as a content item including digital imagery, a link, or a control such as a view, comment, share, or reaction button, or uploads a file, or loads a web page, or scrolls through a feed, etc., event logging service 170 fires an event to capture an identifier, an event type, a date/timestamp at which the user interface event occurred, and possibly other information about the user interface event, such as the impression portal and/or the impression channel involved in the user interface event (e.g., device type, operating system, etc.). Event logging service 170 generates a data stream that includes one record of real-time event data for each user interface event that has occurred.

Data storage system 180 includes data stores and/or data services that store digital content items, data received, used, manipulated, and produced by application software system 130 and/or language agnostic OCR extraction system 140, including vocabularies, indexes, machine learning model training data, model parameters, and model inputs and outputs. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, application software system 130, language agnostic OCR extraction system 140, content serving system 160, event logging service 170, and data storage system 180 includes an interface embodied as computer programming code stored in computer memory that when executed causes a computing device to enable bidirectional communication with any other of user system 110, application software system 130, Language agnostic OCR extraction system 140, content serving system 160, event logging service 170, and data storage system 180 using a communicative coupling mechanism. Examples of communicative coupling mechanisms include network interfaces, inter-process communication (IPC) interfaces and application program interfaces (APIs).

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 can receive the input from the browser or user interface 112, perform at least one operation using the input, and return output to the browser user interface 112 using an HTTP response that the web browser receives and processes.

Each of user system 110, application software system 130, language agnostic OCR extraction system 140, content serving system 160, event logging service 170, and data storage system 180 is implemented using at least one computing device that is communicatively coupled to electronic communications network 120. Any of user system 110, application software system 130, language agnostic OCR extraction system 140, content serving system 160, event logging service 170, and data storage system 180 can be bidirectionally communicatively coupled by network 120. User system 110 as well as other different user systems (not shown) can be bidirectionally communicatively coupled to application software system 130.

A typical user of user system 110 can be an administrator or end user of application software system 130, language agnostic OCR extraction system 140 and/or content serving system 160. User system 110 is configured to communicate bidirectionally with any of application software system 130, language agnostic OCR extraction system 140 and/or content serving system 160 over network 120.

The features and functionality of user system 110, application software system 130, language agnostic OCR extraction system 140, content serving system 160, event logging service 170, and data storage system 180 are implemented using computer software, hardware, or software and hardware, and can include combinations of automated functionality, data structures, and digital data, which are represented schematically in the figures. User system 110, application software system 130, language agnostic OCR extraction system 140, content serving system 160, event logging service 170, and data storage system 180 are shown as separate elements in FIG. 1 for ease of discussion but, except as otherwise described, the illustration is not meant to imply that separation of these elements is required. The illustrated systems, services, and data stores (or their functionality) of each of user system 110, application software system 130, language agnostic OCR extraction system 140, content serving system 160, event logging service 170, and data storage system 180 can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Figure 7:
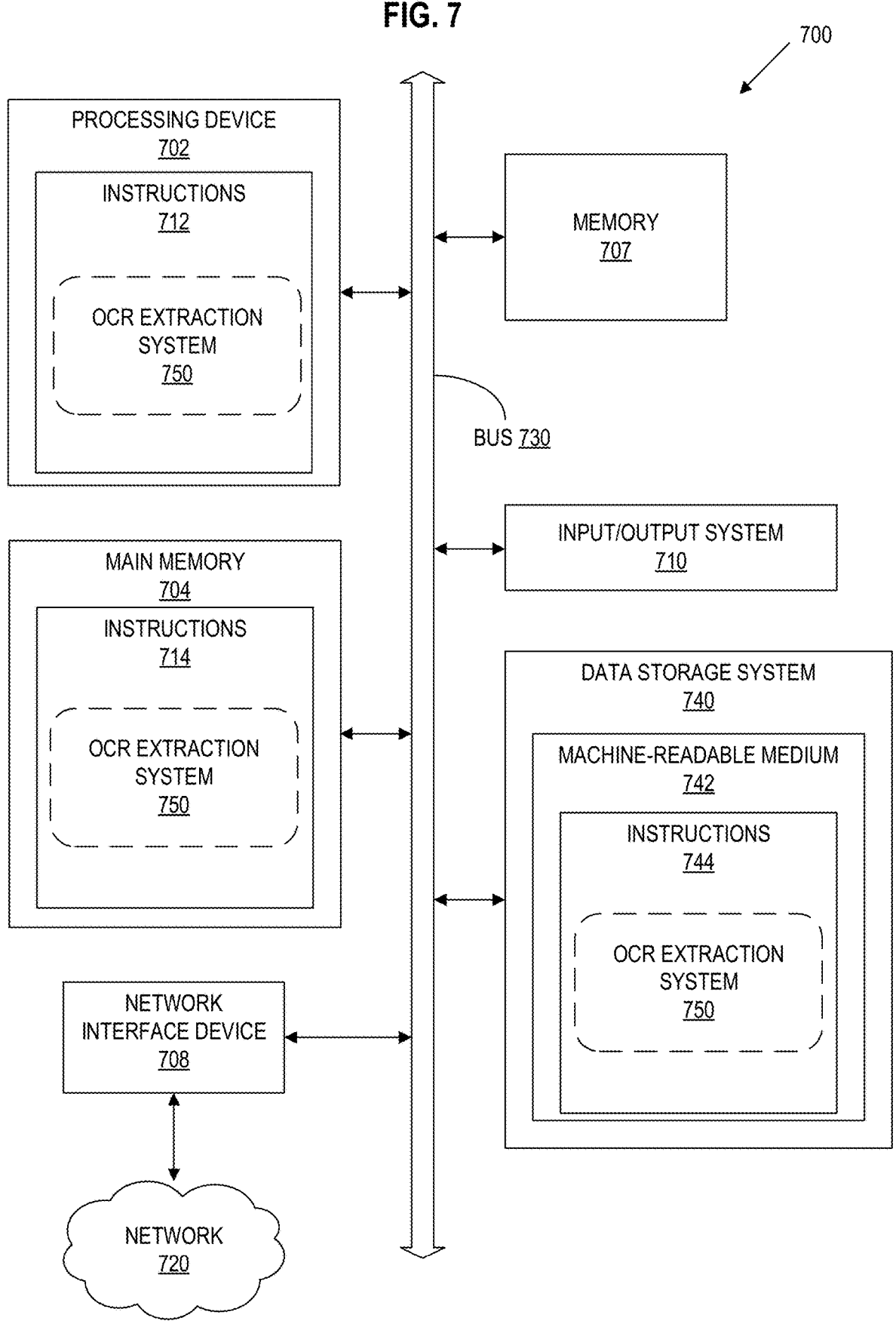
FIG. 7 is a block diagram of an example computer system 700 in which aspects of the present disclosure can operate.

For ease of discussion, in FIG. 7, the language agnostic OCR extraction system 140 is represented as OCR extraction system 750. Further details with regard to the operations of the language agnostic OCR extraction system 140 are described below.

FIG. 1B illustrates an example multimodal language agnostic model 190 in accordance with some embodiments of the present disclosure. In FIG. 1B, the axes x, y, and z represent dimensions in a multidimensional latent space 192. Multimodal and multilingual content items are clustered in different regions of the multidimensional latent space according to semantic similarity. For example, a cluster or subspace 194 includes words in different languages as well as images and OCR extractions that all correspond to the meaning of "drive" in English. The attribution information for the image containing the word drive is Drive by Nick Youngson CC BY-SA 3.0 Pix4free.org. Because the model is word-based as opposed to character-based, an erroneous OCR extraction "DRNE" created by a character-based OCR is correctly included in the "drive" cluster despite the scanning error. Similarly, the clusters 196 and 198 each include multimodal, multilingual semantically similar content items. The parameters of the latent space 192, and thus the spatial arrangement of the clusters 194, 196, 198 within the latent space 192, is dependent upon the training data used to train multimodal language agnostic model 190. For example, the "drive" cluster 194 may be located in a different quadrant of the latent space 192 if different training data were used to train the model 190. The attribution information for the image containing the Hindi word for peace is The word Peace in Hindi Indian in ornament by Goshashka Adobe Stock.

Figure 2:
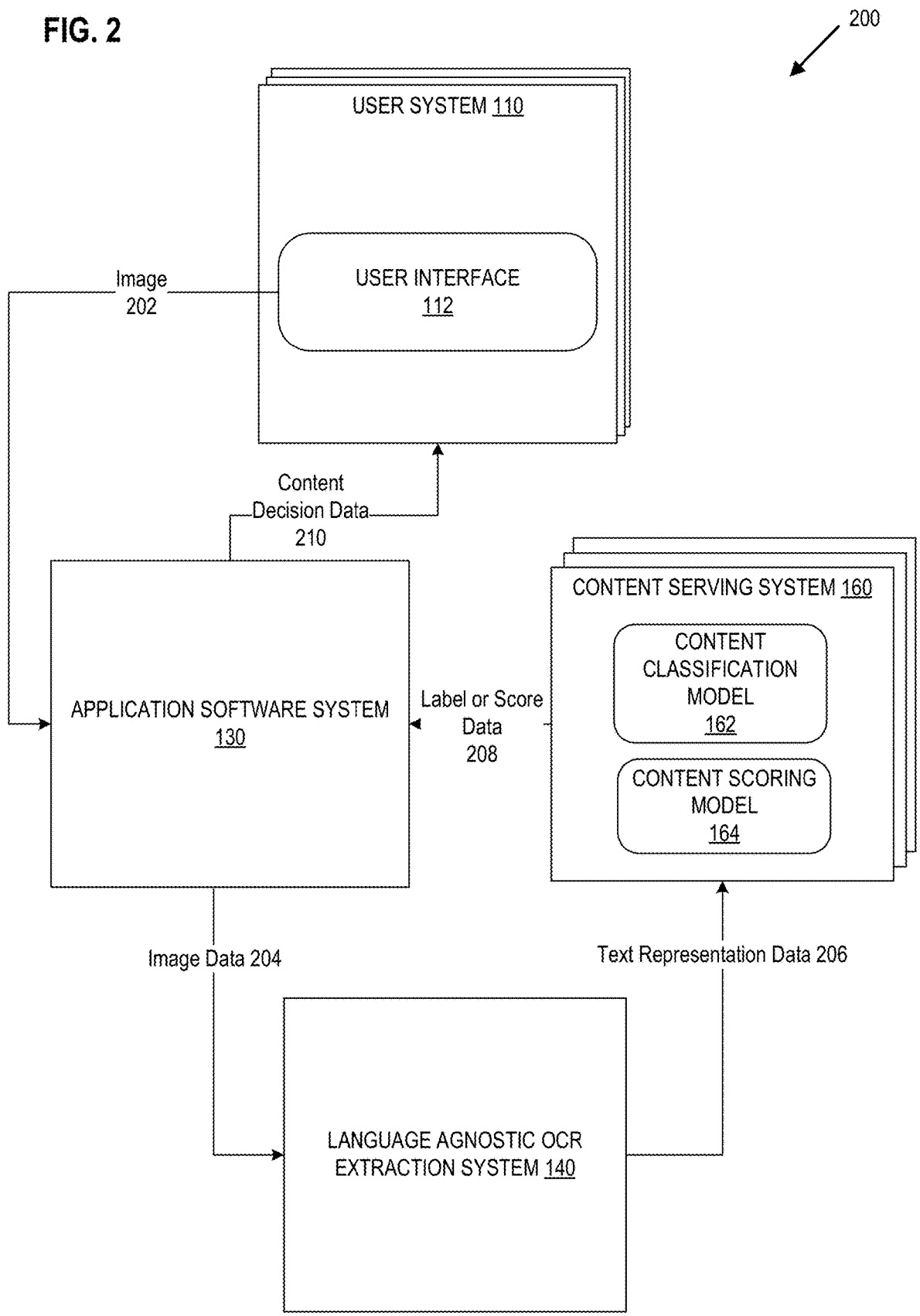
FIG. 2 is a flow diagram of an example method 200 for content analysis using the language agnostic OCR extraction system 140 in accordance with some embodiments of the present disclosure.

FIG. 2 is a flow diagram of an example method 200 for content analysis using the language agnostic OCR extraction system 140 in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by various components of the computing system 100 of FIG. 1 including language agnostic OCR extraction system 140. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

As shown in FIG. 2, in the method 200, application software system 130 receives an image 202 from a user system 110. For example, a user uploads or shares digital imagery to a social media or messaging application. Application software system 130 sends image data 204 corresponding to image 202 to language agnostic OCR extraction system 140. For example, application software system 130 adds metadata to image 202 and provides the image 202 and corresponding metadata, as image data 204, to language agnostic OCR extraction system 140. Examples of metadata include timestamp data and document type data (e.g., .jpeg, .png, .pdf).

Language agnostic OCR extraction system 140 maps image data 204 to a matching (e.g., semantically corresponding) text representation, such as a text embedding and/or plain text. Using the example of FIG. 1B, language agnostic OCR extraction system 140 maps the picture of the word DRIVE to the word text "drive" using the technologies described herein. Language agnostic OCR extraction system 140 outputs text representation data 206 to content serving system 160. An example of text representation data 206 is an image-text pair, such as image 202 and its matching (e.g., semantically corresponding) text and/or text embedding.

The output of language agnostic OCR extraction system 140, i.e., text representation data 206, can be used by content serving system 160 in a number of different ways. For example, content serving system 160 applies content classification model 162 to text representation data 206, and content classification model 162 generates predictive output indicating a mathematical likelihood that image 202 matches a particular label, such as spam or not spam. Alternatively or in addition, content serving system 160 applies content scoring model 164 to text representation data 206, and content scoring model 164 generates a score that quantifies relevance of image 202 to a particular user or query. Content serving system 160 provides the output of model 162 or model 164, as the case may be, e.g. label or score data 208, to application software system 130.

Application software system 130 receives label or score data 208 and applies one or more application decision processes or logic to the label or score data 208. For example, application software system 130 generates content decision data 210 and sends content decision data 210 to user system 110. An example of content decision data 210 is a feed ranking for image 202. Another example of content decision data 210 is a spam label for image 202. User system 110 uses content decision data 210 to determine whether and in what order or arrangement to display image 202 in user interface 112, or to label image 202 as spam in the user's inbox, for instance.

Figure 3:
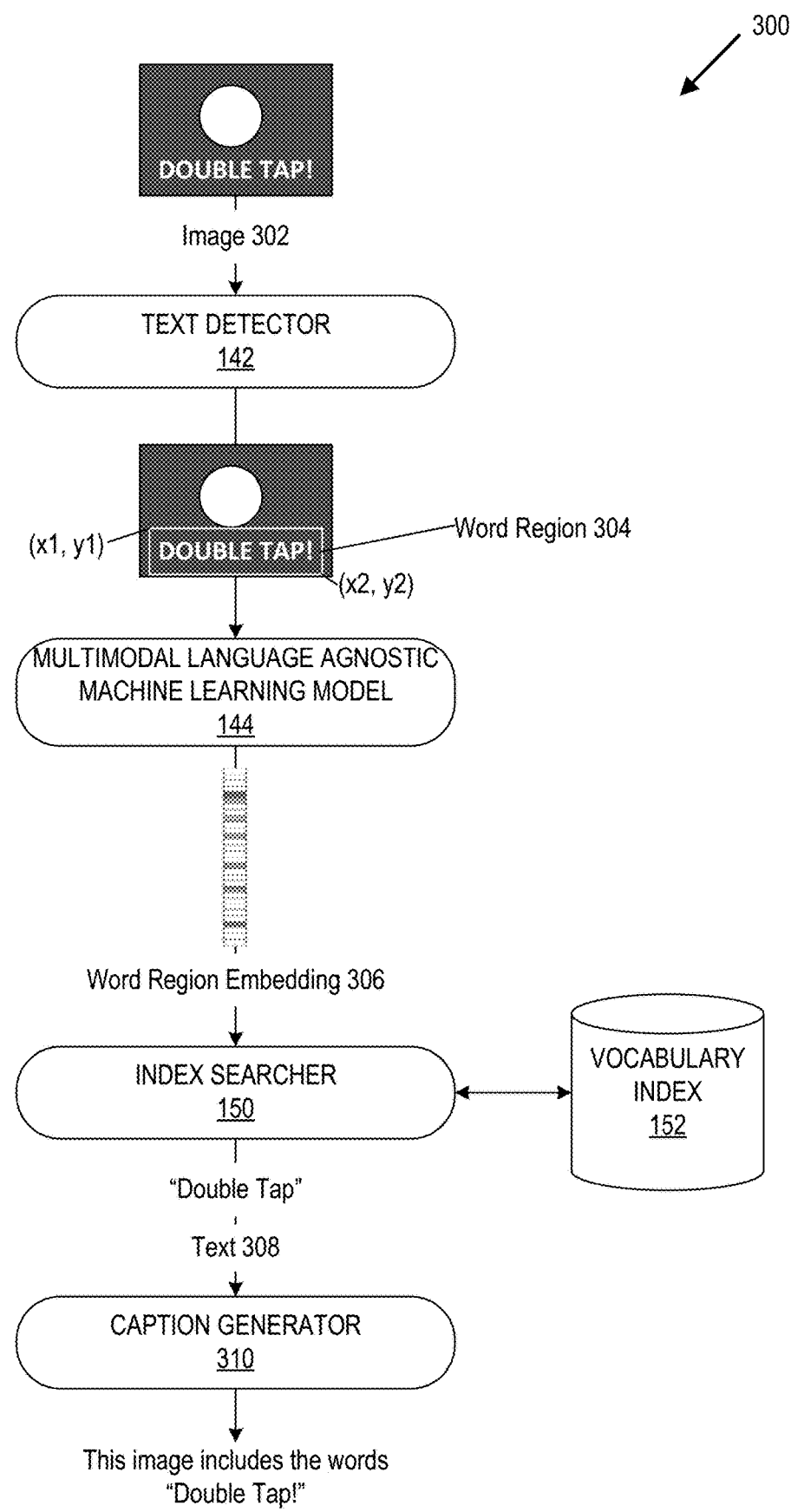
FIG. 3 is a flow diagram of an example method 300 to implement OCR extraction in accordance with some embodiments of the present disclosure.

FIG. 3 is a flow diagram of an example method 300 to implement OCR extraction in accordance with some embodiments of the present disclosure.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the language agnostic OCR extraction system 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 3, an image 302 is input to text detector 142. Text detector 142 scans image 302 using OCR to look for arrangements of pixels that appear to be words in any language. That is, text detector 142 detects the presence of words but does not detect languages and does not label the detected words with language labels. When text detector 142 determines that image 302 contains one or more words, text detector 142 identifies each region of the image that contains one or more words as a region of interest or word region 304. In the example of FIG. 3, image 302 contains non-text regions such as a blue background and a white dot, and also contains the text, DOUBLE TAP! Text detector 142 creates a bounding box around the word region, i.e., the portion of image 302 that contains DOUBLE TAP!, and determines the spatial coordinates of the word region 304 relative to the image as a whole (i.e., the coordinates of the endpoints of the diagonal of the bounding box, (x1, y1), (x2, y2)). Text detector 142 outputs the word region 304 and/or its identifying coordinates.

Word region 304 is received by the multimodal language agnostic machine learning model 144. Multimodal language agnostic model 144 generates and outputs a word region embedding 306 for the word region 304. The word region embedding 306 includes an image embedding generated by image encoder 146, for example. In some implementations, the image 302 including the word region 304 identified by a bounding box is input to multimodal language agnostic model 144 and model 144 generates an image embedding based on the version of image 302 that includes the bounding box that identifies word region 304. In other implementations, only the word region 304 and not the entire image 320 is input to model 144 to produce word region embedding 306.

The word region embedding 306 is used by index searcher 150 to search vocabulary index 152 for a text embedding that matches (e.g., semantically corresponds to) the word region embedding 306. It is possible to match image embeddings with semantically similar text embeddings because model 144 is multimodal. Index searcher 150 performs a nearest neighbor search on the index 152 to find the text embedding that matches (e.g., is semantically nearest to) the word region embedding 306, and outputs the associated plain text from the vocabulary as text 308, e.g., "double tap."

The implementation of language agnostic OCR extraction system 140 shown in FIG. 3 includes a caption generator 310, for example as a component of the system 140. Caption generator 310 is employed in use cases that generate captions for images through an automated process. Caption generator 310 converts the text 308 into a caption, e.g., a natural language sentence that describes the content or subject matter of image 302. Caption generator 310 inserts text 308 into a predefined template, in some implementations. For instance, caption generator 310 stores a template, "This image includes the words [textrep]." Caption generator 310 retrieves the template and replaces [textrep] with text 308 and outputs the combined result as a human readable, natural language caption for image 302. The caption produced by caption generator 310 is provided or made accessible to one or more downstream applications, processes, models, or components of the computing system, such as application software system 130, content serving system 160, content classification model 162, or content scoring model 164.

When image 302 contains multiple different word regions, the above-described operations are repeated for each word region in the image 302 detected by the OCR scanning process in text detector 142.

Figure 4A:
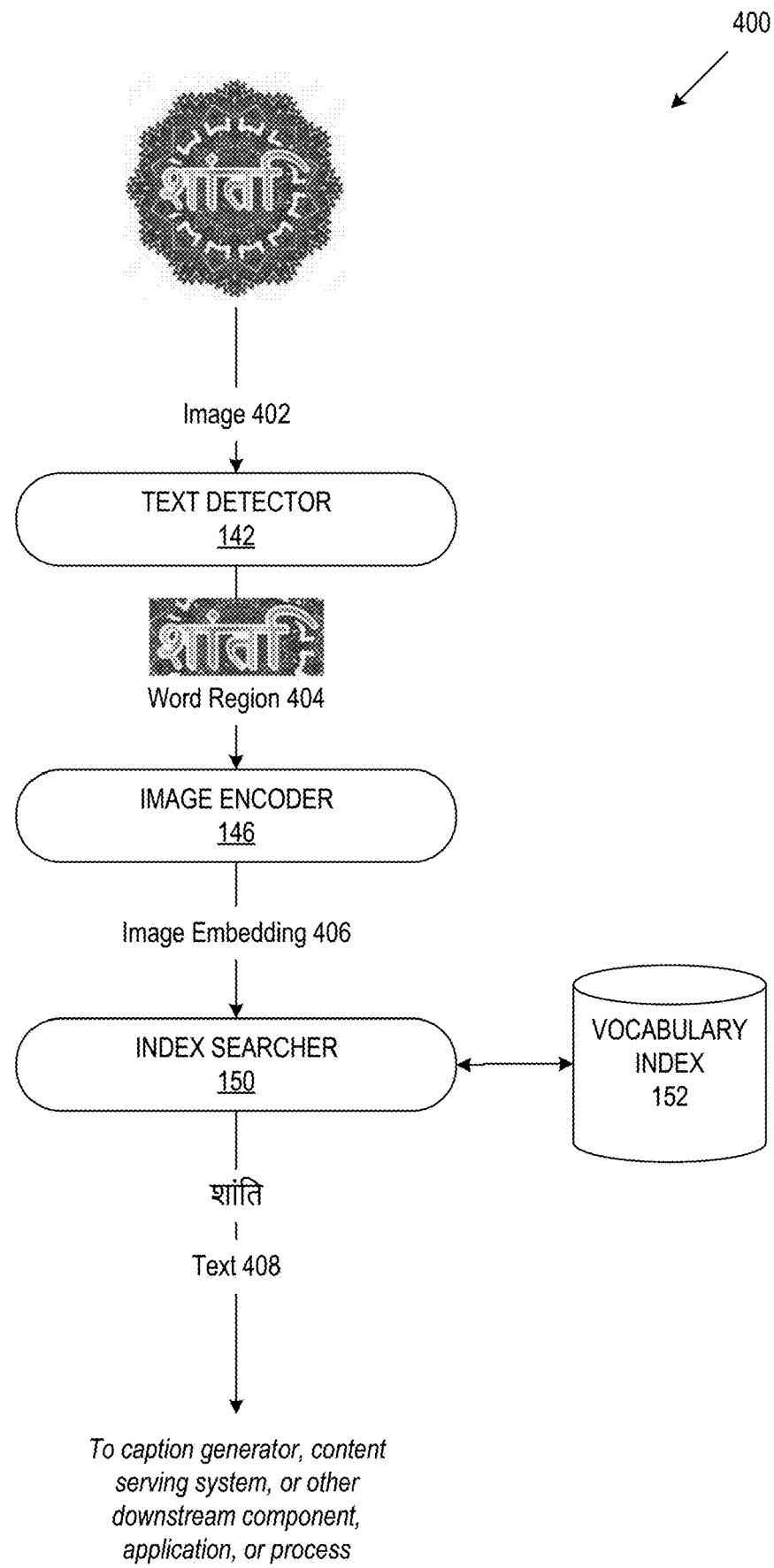
FIG. 4A is a flow diagram of an example method 400 to implement OCR extraction in accordance with some embodiments of the present disclosure.

FIG. 4A is a flow diagram of an example method 400 to implement OCR extraction in accordance with some embodiments of the present disclosure.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the language agnostic OCR extraction system 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 4A, an image 402 is input to text detector 142. Text detector 142 scans image 402 using OCR to look for arrangements of pixels that appear to be words in any language. When text detector 142 determines that image 402 contains one or more words, text detector 142 identifies each region of the image that contains one or more words as a region of interest or word region 404. Text detector 142 creates a bounding box around the word region and determines the spatial coordinates of the word region relative to the image as a whole (i.e., the coordinates of the endpoints of the diagonal of the bounding box). Text detector 142 outputs the word region 404 and/or its identifying coordinates.

Word region 404 is received by image encoder 146 of multimodal language agnostic model 144. Image encoder 146 generates an image embedding 406 for word region 404. Image encoder 146 outputs the image embedding 406.

The image embedding 406 is used by index searcher 150 to search vocabulary index 152 for a text embedding that matches (e.g., semantically corresponds to) the image embedding 406. Index searcher 150 performs a nearest neighbor search on the index 152 to find the text embedding that matches (e.g., is semantically nearest to) the image embedding 406 in the index, and outputs the associated text from the vocabulary as text 408. Text 408 is sent or otherwise made accessible to a caption generator, a content serving system, or one or more other downstream components, applications, or processes. When image 402 contains multiple different word regions, the above-described operations are repeated for each word region of image 402 that is detected by the OCR scanning process of text detector 142.

Taken together, FIG. 3 and FIG. 4A illustrate how language agnostic OCR extraction system 140 can be applied to multiple different images containing words in different languages without needing to be retrained or fine-tuned to accommodate those different languages.

Figure 4B:
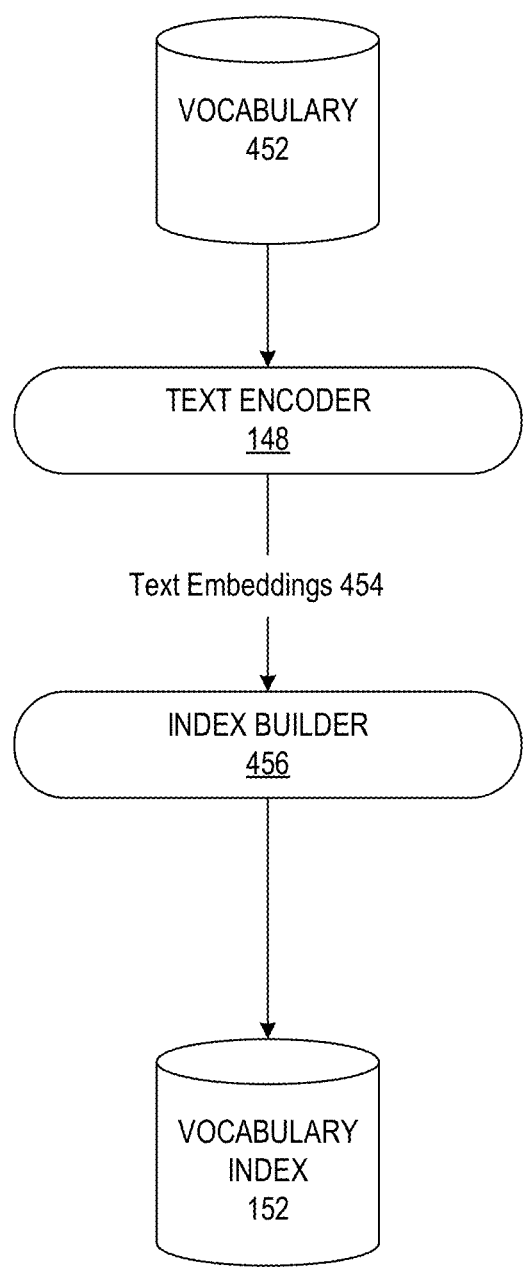
FIG. 4B is a flow diagram of an example method 450 to create a vocabulary index in accordance with some embodiments of the present disclosure.

FIG. 4B is a flow diagram of an example method 450 to create a vocabulary index in accordance with some embodiments of the present disclosure.

The method 450 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the language agnostic OCR extraction system 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 4B, vocabulary 452 is a searchable database of words that is stored, for example, in data storage system 180. Vocabulary 452 can be created using any of the techniques described above with reference to the vocabulary index 152 of FIG. 1, for example. Vocabulary 452 can contain one or more words in any language that is supported by the multimodal language agnostic model 144. In implementations that use a T-UILR based model, for example, vocabulary 452 can include words in up to 94 different languages. In some implementations, vocabulary 452 is a component of language agnostic OCR extraction system 140 or application software system 130.

Each word of vocabulary 452, regardless of its language, is input into text encoder 148. Text encoder 148 generates a text embedding for each input word and outputs associated text embeddings 454. Index builder 456 creates a mapping of text embeddings to vocabulary words and indexes it for nearest neighbor search. The indexed mapping of text embeddings produced by multimodal language agnostic model 144 to associated words of vocabulary 452, which is created by index builder 456, is stored as vocabulary index 152. In some implementations, index builder 456 is a component of language agnostic OCR extraction system 140.

Figure 5:
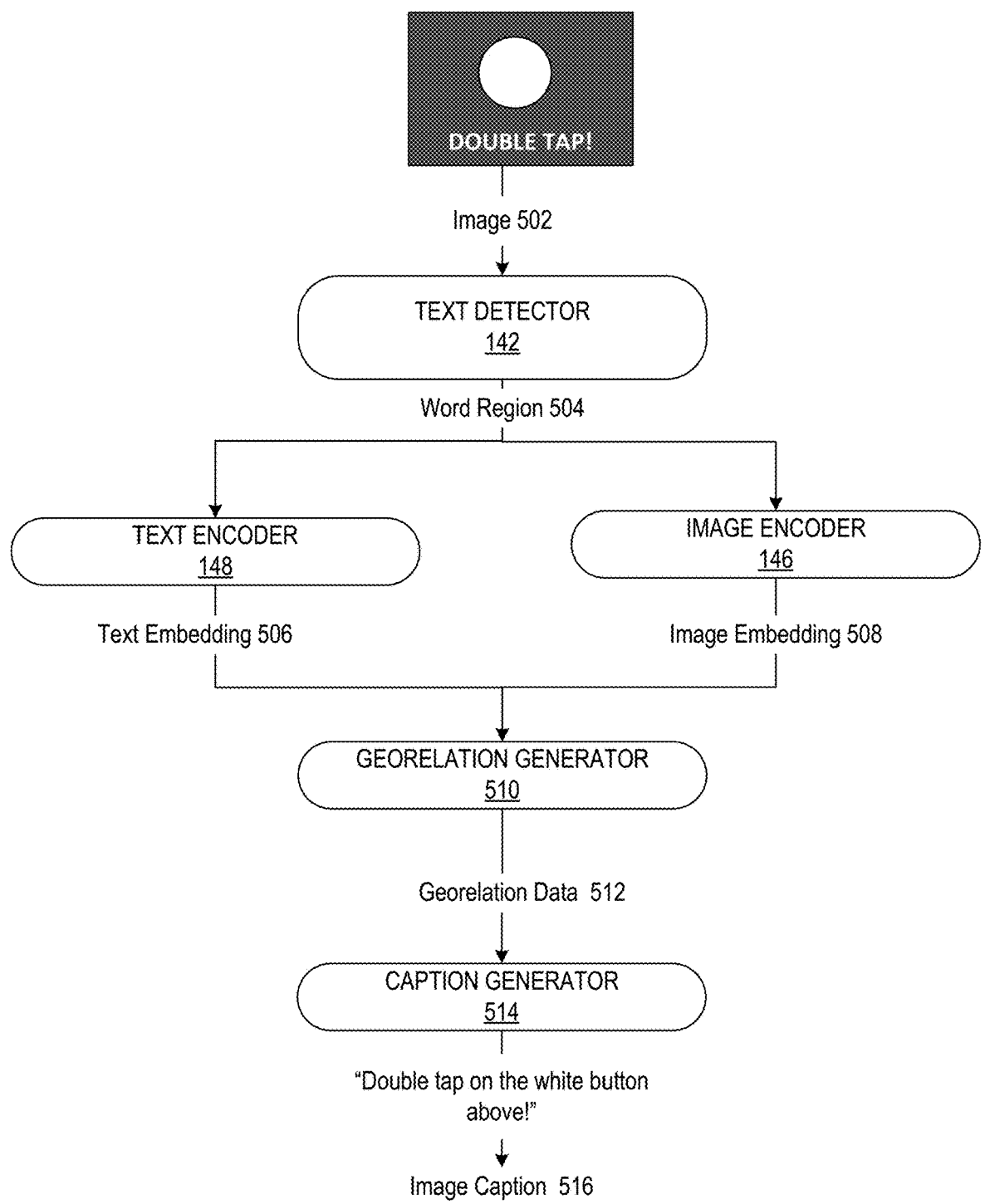
FIG. 5 is a flow diagram of an example method 500 to implement OCR extraction in accordance with some embodiments of the present disclosure.

FIG. 5 is a flow diagram of an example method 500 to implement OCR extraction in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the language agnostic OCR extraction system 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

The implementation of the language agnostic OCR extraction system 140 shown in FIG. 5 includes a georelation generator 510 and a caption generator 514. Caption generator 514 and georelation generator 510 are components of the language agnostic OCR extraction system 140, in some implementations. Caption generator 514 works in a similar manner as caption generator 310, described above with reference to FIG. 3, except that caption generator 510 additionally receives as input georelation data 512 generated by georelation generator 510 and uses georelation data 512 as well as the model output, e.g., text embedding 506 and image embedding 508, to generate image caption 516.

In FIG. 5, an image 502 is input to text detector 142. Text detector 142 identifiers the word region 504, similar to word region 304, in a similar manner as described above with reference to FIG. 3. Word region 504 is converted to a text format, for example by a traditional OCR method or by using index searcher 150. The text format of word region 504 is input to text encoder 148, and text encoder 148 generates text embedding 506 for the text format of word region 504. Image 502 including word region 504 is input to image encoder 146, and image encoder 146 generates image embedding 508. In this example, since image encoder 146 has access to the entire image 502, image embedding 508 contains information about the non-text regions of image 502; i.e., the regions of image 502 that are outside of word region 504. For example, image embedding 508 contains x, y coordinates associated with the white dot below the words DOUBLE TAP!

Georelation generator 510 determines spatial relationships between different text and/or non-text regions of the image 502, in order to improve the resulting caption created by caption generator 514. Georelation generator 510 compares spatial information contained within the text embedding 506 and spatial information contained within the image embedding 508 to generate georelation data 512. For example, georelation generator 510 compares the x, y coordinates of the bounding box that contains the word region 504, obtained from text embedding 506, to the x, y coordinates of the white dot, obtained from image embedding 508. Based on this comparison, in the illustrated example, georelation generator 510 determines the spatial relationship between the word region 504 and other elements of image 502, i.e., the white dot. For example, georelation generator 510 determines, based on the x, y coordinates of word region 504 and the x, y coordinates of the white dot, that the word region 504 is positioned above the white dot in the image 502. This spatial relationship data is output as georelation data 512.

Caption generator 510 receives georelation data 512 and uses the georelation data 512 to generate the image caption 516. Caption generator 510 works in a similar way as caption generator 310, described above with reference to FIG. 3, except that caption generator 510 uses the additional information about non-text elements of the image and information about the spatial relationships between the text and non-text elements within the image, provided by georelation generator 510, to generate the image caption 516. For example, based on the georelation data 512, caption generator 510 selects a different natural language template or inserts additional words into an appropriate natural language template. For instance, whereas caption generator 310, working without georelation data 512, generates a caption, "This image includes the words Double Tap!", which does not include any reference to the position of the words in relation to the white dot, caption generator 510 uses georelation data 512 to generate a more precise caption, "Double tap on the white button below!" which does indicate that the white button is below the words "DOUBLE TAP!" in the image. Image caption 516 produced by caption generator 514 based on georelation data 512 is provided or made accessible to one or more downstream applications, processes, models, or components. For example, image caption 516 is provided or made accessible to application software system 130, content serving system 160, content classification model 162, or content scoring model 164.

Figure 6:
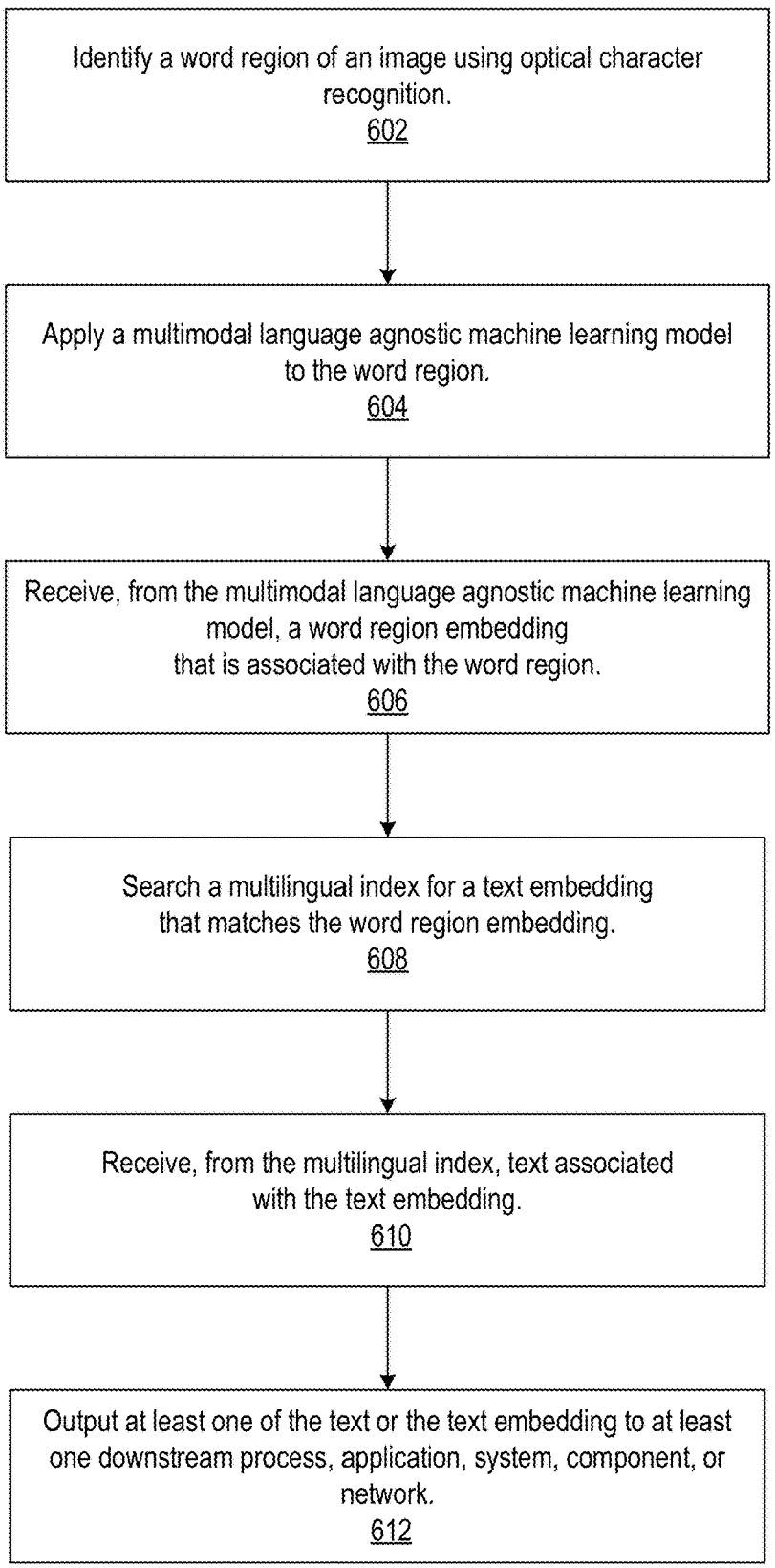
FIG. 6 is a flow diagram of an example method 600 to implement language agnostic OCR extraction in accordance with some embodiments of the present disclosure.

FIG. 6 is a flow diagram of an example method 600 to implement language agnostic OCR extraction in accordance with some embodiments of the present disclosure.

The method 600 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the language agnostic OCR extraction system 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 602, the processing device identifies a word region of an image using optical character recognition. In some implementations, operation 602 is performed by an embodiment of text detector 142, described above with reference to FIG. 1A, FIG. 3, and FIG. 4.

At operation 604, the processing device applies a multimodal language agnostic machine learning model to the word region. In some implementations, the language agnostic machine learning model embeds both natural language texts and images in the same latent space. In some implementations, the language agnostic machine learning model is at least one of a multimodal representation model or a Turing Bletchley model. Operation 604 is performed by an embodiment of multimodal language agnostic machine learning model 144, described above with reference to FIG. 1, FIG. 2, FIG. 3, FIG. 4A, and FIG. 5, for example.

At operation 606, the processing device receives, from the multimodal language agnostic machine learning model, a word region embedding that is associated with the word region. In some implementations, the word region embedding includes an image embedding, the image embedding is used to search the multilingual index, and the text embedding is returned by the search. In some implementations, the word region embedding includes an image embedding generated based on the image, and operation 606 includes computing geo-relation data between the image embedding and a text embedding determined based on the image embedding. In some implementations, a caption is generated for the image based on the geo-relation data. Operation 606 is performed by, for example, an embodiment of multimodal language agnostic machine learning model 144, described above with reference to FIG. 1A, FIG. 1B, FIG. 2, FIG. 3, FIG. 4A, and FIG. 5 alone or in combination with a caption generator such as caption generator 310 or caption generator 514 and/or a georelation generator such as georelation generator 510.

At operation 608, the processing device searches a multilingual index for a text embedding that matches the word region embedding. In some implementations, the multilingual index is created by applying the language agnostic machine learning model to a multilingual vocabulary, where the multilingual vocabulary comprises multiple different words in multiple different languages, receiving, from the language agnostic machine learning model, a set of word embeddings, where the set of word embeddings includes a word embedding for each word in the multilingual vocabulary; and indexing the set of word embeddings. In some implementations, operation 608 uses a nearest neighbor algorithm to index the set of word embeddings. In some implementations, the multilingual vocabulary is created based on terminology used by a particular online system. Operation 608 is performed by an embodiment of index searcher 150, and the index is an embodiment of vocabulary index 152, described above with reference to FIG. 1A, FIG. 3, FIG. 4A, and FIG. 4B, in some implementations.

At operation 610, the processing device receives, from the multilingual index, text associated with the nearest text embedding. Operation 610 is performed by an embodiment of index searcher 150, and the index is an embodiment of vocabulary index 152, described above with reference to FIG. 1A, FIG. 3, FIG. 4A, and FIG. 4B, in some implementations.

At operation 612, the processing device outputs at least one of the text or the text embedding to a downstream process, application, system, or component. In some implementations, the at least one of the text or the text embedding is output to at least one of a content classification model, a content ranking model, a data storage device, or an output device. Operation 612 is performed by an embodiment of language agnostic OCR extraction system 140, described above with reference to FIG. 1A, FIG. 2, FIG. 4A, and FIG. 5, in some implementations. In some implementations, operation 612 includes a caption generator such as caption generator 310 or caption generator 516, which generates a caption for the image based on the text. In some implementations, operation 612 provides the output to a traditional OCR system for use to improve the error correction capabilities of the traditional OCR system. Alternatively or in addition, operation 612 provides the output to an input of language agnostic OCR extraction system 140 in a feedback loop, to improve the language agnostic model such as an embodiment of multimodal language agnostic model 144.

FIG. 7 is a block diagram of an example computer system 700 in which aspects of the present disclosure can operate.

FIG. 7 illustrates an example machine of a computer system 700 within which a set of instructions, for causing the machine to perform any of the methodologies discussed herein, can be executed. In some embodiments, the computer system 700 can correspond to a component of a networked computer system (e.g., as a component of the computer system 100 of FIG. 1) that includes, is coupled to, or utilizes a machine to execute an operating system to perform operations corresponding to the language agnostic OCR extraction system 140 of FIG. 1.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a memory 706 (e.g., flash memory, static random access memory (SRAM), etc.), an input/output system 710, and a data storage system 740, which communicate with each other via a bus 730.

Processing device 702 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be at least one special-purpose processing device such as an application specific integrated circuit (ASIC), a field programmable gate array (FPGA), a digital signal processor (DSP), network processor, or the like. The processing device 702 is configured to execute instructions 712 for performing the operations and steps discussed herein.

In FIG. 7, OCR extraction system 750 represents language agnostic OCR extraction system 140. Instructions 712 include portions of OCR extraction system 750 when those portions of the OCR extraction system 750 are being executed by processing device 702. Thus, similar to the description above, the OCR extraction system 750 is shown in dashed lines as part of instructions 712 to illustrate that, at times, portions of the OCR extraction system 750 are executed by processing device 702. For example, when at least some portion of the OCR extraction system 750 is embodied in instructions to cause processing device 702 to perform the method(s) described above, some of those instructions can be read into processing device 702 (e.g., into an internal cache or other memory) from main memory 704 and/or data storage system 740. However, it is not required that all of the OCR extraction system 750 be included in instructions 712 at the same time and portions of the OCR extraction system 750 are stored in at least one other component of computer system 700 at other times, e.g., when at least one portion of the OCR extraction system 750 are not being executed by processing device 702.

The computer system 700 further includes a network interface device 708 to communicate over the network 720. Network interface device 708 provides a two-way data communication coupling to a network. For example, network interface device 708 can be an integrated-services digital network (ISDN) card, cable modem, satellite modem, or a modem to provide a data communication connection to a corresponding type of telephone line. As another example, network interface device 708 can be a local area network (LAN) card to provide a data communication connection to a compatible LAN. Wireless links can also be implemented. In any such implementation network interface device 708 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 700.

Computer system 700 can send messages and receive data, including program code, through the network(s) and network interface device 708. In the Internet example, a server can transmit a requested code for an application program through the Internet and network interface device 708. The received code can be executed by processing device 702 as it is received, and/or stored in data storage system 740, or other non-volatile storage for later execution.

The input/output system 710 includes an output device, such as a display, for example a liquid crystal display (LCD) or a touchscreen display, for displaying information to a computer user, or a speaker, a haptic device, or another form of output device. The input/output system 710 can include an input device, for example, alphanumeric keys and other keys configured for communicating information and command selections to processing device 702. An input device can, alternatively or in addition, include a cursor control, such as a mouse, a trackball, or cursor direction keys for communicating direction information and command selections to processing device 702 and for controlling cursor movement on a display. An input device can, alternatively or in addition, include a microphone, a sensor, or an array of sensors, for communicating sensed information to processing device 702. Sensed information can include voice commands, audio signals, geographic location information, and/or digital imagery, for example.

The data storage system 740 includes a machine-readable storage medium 742 (also known as a computer-readable medium) on which is stored at least one set of instructions 744 or software embodying any of the methodologies or functions described herein. The instructions 744 can also reside, completely or at least partially, within the main memory 704 and/or within the processing device 702 during execution thereof by the computer system 700, the main memory 704 and the processing device 702 also constituting machine-readable storage media.

In one embodiment, the instructions 744 include instructions to implement functionality corresponding to an OCR extraction system (e.g., the language agnostic OCR extraction system 140 of FIG. 1).

Dashed lines are used in FIG. 7 to indicate that it is not required that the OCR extraction system be embodied entirely in instructions 712, 714, and 744 at the same time. In one example, portions of the OCR extraction system are embodied in instructions 744, which are read into main memory 704 as instructions 714, and portions of instructions 714 are read into processing device 702 as instructions 712 for execution. In another example, some portions of the OCR extraction system are embodied in instructions 744 while other portions are embodied in instructions 714 and still other portions are embodied in instructions 712.

While the machine-readable storage medium 742 is shown in an example embodiment to be a single medium, the term "machine-readable storage medium" should be taken to include a single medium or multiple media that store the at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer.

For example, a computer system or other data processing system, such as the computing system 100, can carry out the above-described computer-implemented methods 200, 300, 500, 600, in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes identifying a word region of an image using optical character recognition; the word region includes a set of bounding box coordinates; applying a language agnostic machine learning model to the word region; the language agnostic machine learning model is trained on training data including a set of image-text pairs and a set of multilingual text translation pairs; receiving, from the language agnostic machine learning model, a word region embedding that is associated with the word region; searching a multilingual index for a text embedding that matches the word region embedding; receiving, from the multilingual index, text associated with the text embedding; and outputting at least one of the text or the text embedding to at least one downstream process, application, system, component, or network.

An example 2 includes the subject matter of example 1, further including outputting the at least one of the text or the text embedding to at least one of: a content classification model; a content ranking model; a data storage device; or an output device. An example 3 includes the subject matter of example 2, further including: based on the text, generating and outputting a caption for the image. An example 4 includes the subject matter of any of examples 1-3, further including creating the multilingual index by: applying the language agnostic machine learning model to a multilingual vocabulary; the multilingual vocabulary includes a plurality of different words in a plurality of different languages; receiving, from the language agnostic machine learning model, a set of word embeddings; the set of word embeddings includes a word embedding for each word in the multilingual vocabulary; and indexing the set of word embeddings. An example 5 includes the subject matter of example 4, further including: using a nearest neighbor algorithm to index the set of word embeddings. An example 6 includes the subject matter of example 4, further including: creating the multilingual vocabulary based on words extracted from a particular online system. An example 7 includes the subject matter of any of examples 1-6, where the language agnostic machine learning model embeds both natural language texts and images in a same latent space. An example 8 includes the subject matter of any of examples 1-7, where the language agnostic machine learning model includes at least one of a multimodal representation model or a Turing Bletchley model. An example 9 includes the subject matter of any of examples 1-8, where the word region embedding includes an image embedding, the image embedding is used to perform a search of the multilingual index, and the text embedding is returned by the search. An example 10 includes the subject matter of any of examples 1-9, where the word region embedding includes an image embedding generated based on the image, and the method further includes: computing geo-relation data between the image embedding and a text embedding determined based on the image embedding; and generating a caption for the image based on the geo-relation data.

In an example 11, a system includes: at least one memory; and at least one processor coupled to the at least one memory; where the at least one memory includes instructions that, when executed by the at least one processor cause the at least one processor to perform operations including: identifying a word region of an image using optical character recognition; the word region includes a set of bounding box coordinates; applying a language agnostic machine learning model to the word region; the language agnostic machine learning model is trained on training data including a set of image-text pairs and a set of multilingual text translation pairs; receiving, from the language agnostic machine learning model, a word region embedding that is associated with the word region; searching a multilingual index for a text embedding that matches the word region embedding; receiving, from the multilingual index, text associated with the text embedding; and outputting at least one of the text or the text embedding to at least one downstream process, application, system, component, or network.

An example 12 includes the subject matter of example 11, where the instructions, when executed by the at least one processor, cause the at least one processor to perform operations further including: outputting the at least one of the text or the text embedding to at least one of: a content classification model; a content ranking model; a data storage device; or an output device. An example 13 includes the subject matter of example 12, where the instructions, when executed by the at least one processor, cause the at least one processor to perform operations further including: based on the text, generating and outputting a caption for the image. An example 14 includes the subject matter of any of examples 11-13, where the instructions, when executed by the at least one processor, cause the at least one processor to perform operations further including creating the multilingual index by: applying the language agnostic machine learning model to a multilingual vocabulary; the multilingual vocabulary includes a plurality of different words in a plurality of different languages; receiving, from the language agnostic machine learning model, a set of word embeddings; the set of word embeddings includes a word embedding for each word in the multilingual vocabulary; and indexing the set of word embeddings. An example 15 includes the subject matter of example 14, where the instructions, when executed by the at least one processor, cause the at least one processor to perform operations further including: using a nearest neighbor algorithm to index the set of word embeddings. An example 16 includes the subject matter of example 14, where the instructions, when executed by the at least one processor, cause the at least one processor to perform operations further including: creating the multilingual vocabulary based on words extracted from a particular online system. An example 17 includes the subject matter of any of examples 11-16, where the language agnostic machine learning model embeds both natural language texts and images in a same latent space. An example 18 includes the subject matter of any of examples 11-17, where the language agnostic machine learning model includes at least one of a multimodal representation model or a Turing Bletchley model. An example 19 includes the subject matter of any of examples 11-18, where the word region embedding includes an image embedding, the image embedding is used to perform a search of the multilingual index, and the text embedding is returned by the search. An example 17 includes the subject matter of any of examples 11-19, where the word region embedding includes an image embedding generated based on the image, and the instructions, when executed by the at least one processor, cause the at least one processor to perform operations further including: computing geo-relation data between the image embedding and a text embedding determined based on the image embedding; and generating a caption for the image based on the geo-relation data.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   identifying a word region of an image using optical character recognition;
   the word region comprises a set of bounding box coordinates;
   applying a language agnostic machine learning model to the word region;
   the language agnostic machine learning model is trained on training data comprising a set of image-text pairs and a set of multilingual text translation pairs;
   receiving, from the language agnostic machine learning model, a word region embedding that is associated with the word region;
   searching a multilingual index for a text embedding that matches the word region embedding;
   receiving, from the multilingual index, text associated with the text embedding; and
   using at least one of the text or the text embedding to determine whether or how to display the image via a user interface at a device.

2. The method of claim 1, further comprising outputting the at least one of the text or the text embedding to at least one of:
   a content classification model;
   a content ranking model;
   a data storage device; or
   an output device.

3. The method of claim 2, further comprising:
   based on the text, generating and outputting a caption for the image.

4. The method of claim 1, further comprising creating the multilingual index by:
   applying the language agnostic machine learning model to a multilingual vocabulary;
   the multilingual vocabulary comprises a plurality of different words in a plurality of different languages;
   receiving, from the language agnostic machine learning model, a set of word embeddings;
   the set of word embeddings comprises a word embedding for each word in the multilingual vocabulary; and
   indexing the set of word embeddings.

5. The method of claim 4, further comprising:
   using a nearest neighbor algorithm to index the set of word embeddings.

6. The method of claim 4, further comprising:
   creating the multilingual vocabulary based on words extracted from a particular online system.

7. The method of claim 1, wherein the language agnostic machine learning model embeds both natural language texts and images in a same latent space.

8. The method of claim 1, wherein the language agnostic machine learning model comprises at least one of a multimodal representation model or a Turing Bletchley model.

9. The method of claim 1, wherein the word region embedding comprises an image embedding, the image embedding is used to perform a search of the multilingual index, and the text embedding is returned by the search.

10. The method of claim 1, wherein the word region embedding comprises an image embedding generated based on the image, and the method further comprises:
    computing geo-relation data between the image embedding and a text embedding determined based on the image embedding; and
    generating a caption for the image based on the geo-relation data.

11. A system comprising:
    at least one memory; and
    at least one processor coupled to the at least one memory;
    wherein the at least one memory comprises instructions that, when executed by the at least one processor cause the at least one processor to perform operations comprising:
    identifying a word region of an image using optical character recognition;
    the word region comprises a set of bounding box coordinates;
    applying a language agnostic machine learning model to the word region;
    the language agnostic machine learning model is trained on training data comprising a set of image-text pairs and a set of multilingual text translation pairs;
    receiving, from the language agnostic machine learning model, a word region embedding that is associated with the word region;
    searching a multilingual index for a text embedding that matches the word region embedding;

receiving, from the multilingual index, text associated with the text embedding; and using at least one of the text or the text embedding to determine whether or how to display the image via a user interface at a device.

12. The system of claim 11, wherein the instructions, when executed by the at least one processor, cause the at least one processor to perform operations further comprising:

outputting the at least one of the text or the text embedding to at least one of: a content classification model; a content ranking model; a data storage device; or an output device.

13. The system of claim 12, wherein the instructions, when executed by the at least one processor, cause the at least one processor to perform operations further comprising:

based on the text, generating and outputting a caption for the image.

14. The system of claim 11, wherein the instructions, when executed by the at least one processor, cause the at least one processor to perform operations further comprising creating the multilingual index by:

applying the language agnostic machine learning model to a multilingual vocabulary;

the multilingual vocabulary comprises a plurality of different words in a plurality of different languages;

receiving, from the language agnostic machine learning model, a set of word embeddings;

the set of word embeddings comprises a word embedding for each word in the multilingual vocabulary; and indexing the set of word embeddings.

15. The system of claim 14, wherein the instructions, when executed by the at least one processor, cause the at least one processor to perform operations further comprising:

using a nearest neighbor algorithm to index the set of word embeddings.

16. The system of claim 14, wherein the instructions, when executed by the at least one processor, cause the at least one processor to perform operations further comprising:

creating the multilingual vocabulary based on words extracted from a particular online system.

17. The system of claim 11, wherein the language agnostic machine learning model embeds both natural language texts and images in a same latent space.

18. The system of claim 11, wherein the language agnostic machine learning model comprises at least one of a multimodal representation model or a Turing Bletchley model.

19. The system of claim 11, wherein the word region embedding comprises an image embedding, the image embedding is used to perform a search of the multilingual index, and the text embedding is returned by the search.

20. The system of claim 11, wherein the word region embedding comprises an image embedding generated based on the image, and the instructions, when executed by the at least one processor, cause the at least one processor to perform operations further comprising:

computing geo-relation data between the image embedding and a text embedding determined based on the image embedding; and generating a caption for the image based on the geo-relation data.

* * * * *